US008860844B2

(12) United States Patent
Choi et al.

(10) Patent No.: US 8,860,844 B2
(45) Date of Patent: Oct. 14, 2014

(54) IMAGE PROCESSING THAT GENERATES HIGH DEFINITION AND GENERAL DEFINITION VIDEO AT THE SAME TIME

(75) Inventors: Dong-Young Choi, Gyeongbuk (KR); Kang-Wook Kim, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 244 days.

(21) Appl. No.: 12/724,514

(22) Filed: Mar. 16, 2010

(65) Prior Publication Data
US 2010/0231743 A1   Sep. 16, 2010

(30) Foreign Application Priority Data
Mar. 16, 2009   (KR) .................. 10-2009-0022135

(51) Int. Cl.
H04N 9/73       (2006.01)
H04N 5/225      (2006.01)
H04N 5/232      (2006.01)
H04N 5/91       (2006.01)

(52) U.S. Cl.
CPC .............. H04W 5/232 (2013.01); H04N 5/225 (2013.01); H04N 5/2257 (2013.01); H04N 5/23232 (2013.01); H04N 5/91 (2013.01)
USPC .................. 348/231.2; 348/207.99

(58) Field of Classification Search
USPC .................... 348/231.99, 36, 222.1
See application file for complete search history.

(56) References Cited

U.S. PATENT DOCUMENTS 7,839,429 B2 *  11/2010  Williams et al. .............. 348/50

FOREIGN PATENT DOCUMENTS

| EP | 1901553 A1 | 3/2008 | ............ H04N 5/91 |
| JP | 2005-118158 | 5/2005 | ............ A61B 1/04 |
| JP | 2007-081459 | 3/2007 | ............ H04N 5/225 |
| JP | 2008-099176 | 4/2008 | ............ H04N 5/91 |
| WO | WO 98/57300 | 12/1998 | ............ G06T 3/40 |

OTHER PUBLICATIONS

Tecu, Kirk S., et al.; Patent Application Publication No. US 2004/0051793 A1; Publication Date: Mar. 18, 2004; "Imaging Device;"..

"Merriam-Webster while"; May 13, 2014; XP055117726; http://www.meriam-webster.com/dictionary/while.

* cited by examiner

Primary Examiner — Joel Fosselman
(74) Attorney, Agent, or Firm — Cha & Reiter, LLC.

(57) ABSTRACT

An image processing apparatus is provided, which includes a camera part for imaging an object and outputting image data; a display part for receiving an image signal corresponding to the image data of the camera part and displaying a corresponding image; and an image controller for outputting an image signal processed from the image data output from the camera part, to the display part, generating and storing a corresponding image file. When generating a first image file by processing the image data provided from the camera part, the image controller selectively generates and stores a second image file of a lower capacity and a lower resolution than the first image file at the same time. By distinguishing and using the high definition video and the general definition video made from the corresponding object at the same time, in the corresponding operation such as preview, transfer to other terminal, and connection to high definition player, the image processing apparatus can enhance the management efficiency of the terminal and the user's satisfaction.

13 Claims, 2 Drawing Sheets

IMAGE PROCESSING THAT GENERATES HIGH DEFINITION AND GENERAL DEFINITION VIDEO AT THE SAME TIME

CLAIM OF PRIORITY

This application claims, under 35 U.S.C. §119, priority to and the benefit of earlier filing date of, that patent application entitled "APPARATUS ANS METHOD FOR IMAGE PROCESSING" filed in the Korean Intellectual Property Office on Mar. 16, 2009 as Serial No. 10-2009-0022135, the contents of which are incorporated by reference in its entirety.

BACKGROUND OF THE INVENTION

1. Field of the Invention

The present invention relates the field of imaging in a portable terminal. More particularly, the present invention relates to image processing apparatus and method for generating and processing an image of an object.

2. Description of the Related Art

In recent, as information communication through the use of media such as Internet, and devices such as digital cameras, and mobile phones advances, ordinary people, not expert groups, are producing significant information at an ever increasing rate. For example, user created content (UCC) and user generated content (UGC) are becoming common in the Internet In addition, digital devices having a video capturing function are attracting attention, and products supporting a High Definition (HD) video with higher resolution and frames than the existing devices are gaining in popularity. Products for capturing the video include portable terminals that are both portable and have high quality. This quality is approaching the quality of standalone camcorders and other types of video capture devices.

The portable terminal employs a high definition camera module (hereafter, referred to as a HD camera module) for capturing HD videos. The HD camera module provides an improved quality over that of a VGA (Video Graphic Array) level, which was the video limitation of the existing portable terminals. In addition, the HD camera module can improve the picture quality in low light and severe noise conditions, which are the shortcomings of the conventional camera module.

However, compared to the conventional video, the captured HD video has considerable data capacity and frame size limitations. As a result, it is hard to resize the video to a small size, such as preview, and it takes much time to decode the video.

Because of the considerable data capacity and frame size of the HD video, the transfer of the HD video to other terminals is quite inefficient. Further, when the terminal for receiving the HD video does not support the HD video, a compatibility problem is likely to occur.

SUMMARY OF THE INVENTION

The present invention provides an apparatus and a method for generating at least one video, which have different definitions on what function is running.

An exemplary aspect of the present invention is to provide an apparatus and a method for raising management efficiency of a terminal by generating a high definition video of a HD level and a general definition video of a VGA level when videoing a corresponding object and then distinguishing the videos in a corresponding operation of the terminal when using the videos.

Another exemplary aspect of the present invention is to provide an apparatus and a method for meeting a user's satisfaction by concurrently generating a high definition video and a general definition video of a corresponding object and then supporting the general definition video in an operation which requires rapid access.

Yet another exemplary aspect of the present invention is to provide an apparatus and a method for other terminals to receive and share a general definition video even when the other terminals do not support a high definition video, by concurrently generating the high definition video and the general definition video of a corresponding object.

In accordance with an exemplary aspect of the present invention, an image processing apparatus includes a camera part for imaging an object and outputting image data; a display part for receiving an image signal corresponding to the image data of the camera part and displaying a corresponding image; and an image controller for outputting an image signal processed from the image data output from the camera part, to the display part, generating and storing a corresponding image file. When generating a first image file by processing the image data provided from the camera part, the image controller selectively generates and stores a second image file of a lower capacity and a lower resolution than the first image file at the same time.

In accordance with another exemplary aspect of the present invention, in an image processing apparatus which comprises a camera part for imaging an object and outputting image data, a display part for receiving an image signal corresponding to the image data of the camera part and displaying a corresponding image, and an image controller for outputting the image signal to the display part by processing the image data output from the camera part, generating and storing a corresponding image file, an image processing method includes when generating a first image file by processing the image data provided from the camera part, selectively generating and storing a second image file of a lower capacity and a lower resolution than the first image file at the same time; and controlling to selectively access the first image file and the second image file in an image related operation.

Other exemplary aspects, advantages, and salient features of the invention will become apparent to those skilled in the art from the following detailed description, which, taken in conjunction with the annexed drawings, discloses certain exemplary embodiments of the invention detail.

BRIEF DESCRIPTION OF THE DRAWINGS

The above features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" as used herein refers to the fact that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide. Preferred exemplary embodiments of the present invention will be described below with reference to the accompanying drawings.

Exemplary embodiments of the present invention provide image processing apparatus and method of a portable terminal. The image processing apparatus and method concurrently generate a high definition video of a High Definition (HD) level and a general definition video of a Video Graphics Array (VGA) level of a corresponding object and thus allow the selective access in a corresponding operation of the terminal.

Figure 1:
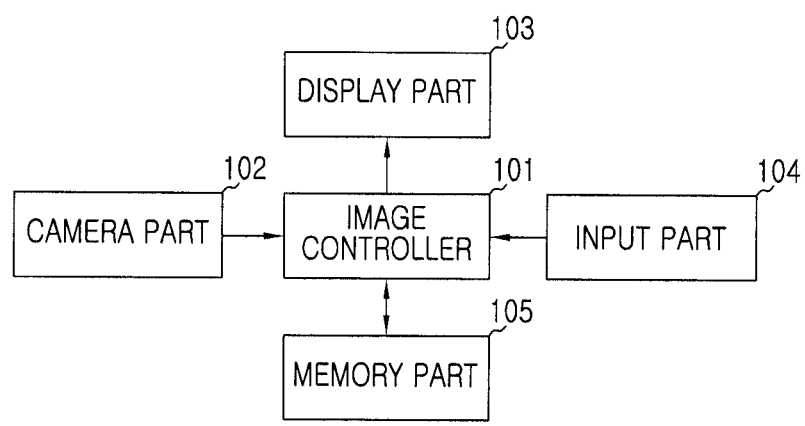
FIG. 1 is a block diagram of an image processing apparatus according to an exemplary embodiment of the present invention.

FIG. 1 is a block diagram of an image processing apparatus according to an exemplary embodiment of the present invention.

Referring now to FIG. 1, the image processing apparatus includes an image controller 101, a camera part 102, a display part 103, an input part 104, and a memory part 105.

The camera part 102 may include an optical imaging system for imaging an object, and a sensor for converting the light formed at the optical imaging system to an electrical signal. The optical imaging system may include a lens, a barrel, an infrared cut-off filter, an optical zoom, an aperture, a shutter, and so on, which are well-known components and are not shown. The sensor digitizes the light to the electrical signal; that is, forms the image. The sensor produces image data per pixel.

The input part 104 includes numeral keys for capturing the video, and function keys for various functions. The input part 104 issues a key signal corresponding to a key pressed by a user, to the controller 101.

The memory part 105 stores data required to control the image processing apparatus, and image files generated. The memory part 105 provides the stored data and files to the image controller 101.

The display part 104 displays an operation status of the image processing apparatus under the control of the controller 101. The display part 103 may be implemented using a Liquid Crystal Display (LCD) or an Organic Light Emitting Diode (OLED) or other similar type of display devices.

The image controller 101 converts the electrical signal (the image data) output from the camera part 102 back to the image signal. The image controller 101 controls the optical zoom and the shutter of the optical imaging system, and adjusts the color and the brightness of the image data of the camera part 102 to generate an actual image. More specifically, for converting the electrical signal received from the camera part 102 in real time to the image signal, the image controller 101 executes various algorithms in relation to the definition of the acquired image. The algorithms may include an Auto Exposure (AE) correction for maintaining the optimum brightness of the image regardless of the luminance of the light source, an Auto White Balance (AWB) for automatically adjusting the white balance according to the color temperature change of the incident light source, and an Auto Focus (AF) for automatically focusing on the subject. The image controller 101 can determine the F numbers of the aperture (diameter of the aperture/focal distance of the lens) and the shutter speed by analyzing frequency components of the image data output from the camera part 102 in real time and recognizing the sharpness of the image. That is, when entering a photographing mode, the image controller 101 applies the aforementioned algorithms in real time and represents the corresponding subject in the display part 103.

When the photographing commences, the image controller 101 acquires the image data output from the camera part 102 in real time by applying the aforementioned algorithms and temporarily storing the image data in the memory part 105. Next, when detecting the end of the photographing, the image controller 101 generates a video file by compressing and encoding the temporarily stored image data and controls the storage of the generated video file to the memory part 105.

The image controller 101 can selectively generate the high definition video file at a HD level and the general definition video file at a VGA level from the video data output from the camera part 102. The image controller 101 includes a first image controller for generating the HD video file (hereafter, referred to as a HD video) with a high definition resolution, and a second image controller for generating the video with a general definition resolution (hereafter, referred to as a general video). In this exemplary embodiment of the present invention, the display part 103 can output the image data with a resolution that can be processed by a first image controller or a second image controller.

When making the general video, the second image controller obtains the image data of the general resolution (e.g., 800×480) from the camera part 102 in real time. In so doing, the first image controller may first receive the image data of the general resolution from the camera part 102 and forward the received image data to the second image controller. Alternatively, in the general video shooting, the first image controller may be deactivated and the second image controller may receive the image data of the general resolution directly from the camera part 102. After applying the aforementioned algorithms, the second image controller outputs the image data of the general video resolution obtained from the camera part 102 in real time, to the display part 103 for the preview of the user. The second image controller temporarily stores the image data applying the algorithms to the memory part 105 in real time. Next, the second image controller detects the termination of the photographing and controls the processing to compress and encode the temporarily stored image data, to generate the corresponding general video file, and to store the general video file to the memory part 105.

To play the general video file, the second image controller controls the processing to decode the general video file to obtain the general video data and to output the general video data to the display part 103. Herein, the display part 103 is able to process the resolution of the general video data output from the second image controller.

When shooting the HD video, the first image controller obtains the image data of the high resolution (e.g., 1280×720) from the camera part 102 in real time. Next, the first image controller temporarily stores the image data of the high resolution acquired from the camera part 102 to the memory part 105 by applying the aforementioned algorithms. Simultaneously, when the display part 103 is able to process the video data of the higher resolution, the first image controller presents the video data of the higher resolution of the captured subject through the display part 103. In this exemplary embodiment, the display part 103 is assumed to process the image data of the general resolution output from the second image controller. The first image controller may convert the image data of the high resolution obtained from the camera part 102 in real time, to the general resolution image data (e.g., 800×480) and output the converted image data to the display part 103. Alternatively, the first image controller converts the image data of the high resolution obtained from the camera part 102 in real time, to the general resolution image data (e.g., 800×480) and outputs the converted image data to the second image controller. Next, the second image controller controls the output of the resized image data of the corresponding resolution fed from the first image controller, to the display part 103 by applying the aforementioned algorithms. At this time, the display part 103 should be able to process the resolution of the image data output from the second image controller. Next, the first image controller detects the termination of the photographing and controls the processing to compress and encode the temporarily stored image data of the high resolution, to generate as the corresponding HD video file, and to store the HD video file to the memory part 105.

In particular, the image controller 101 can generate the HD video file and the general video of the corresponding object at the same time. The first image controller obtains the image data of the high resolution (e.g., 1280×720) from the camera part 102 in real time. Simultaneously, the first image controller needs to show the captured image in the display part 103. Herein, the display part 103 is assumed to also process the image data of the general resolution output from the second image controller. The first image controller converts the image data of the high resolution acquired from the camera part 102, to the image data of the general resolution processable by the second image controller and the display part 103, and outputs the converted image data to the second image controller. Next, the second image controller controls to output the received image data of the general resolution to the display part 103 by applying the aforementioned algorithms. The first image controller temporarily stores the image data of the high resolution attained from the camera part 102 in real time, to the memory part 105 by applying the aforementioned algorithms. Concurrently, the second image controller temporarily stores the image data of the general resolution fed from the first image controller, to the memory part 105. Next, the first image controller and the second image controller control to compress and encode the high resolution image data and the general resolution image data temporarily stored, to generate them as files, and to store the files to the memory part 105 respectively.

More specifically, as shooting the HD video of the corresponding object, the first image controller needs to represent the captured screen in the display part 103 capable of processing the general resolution video in real time. For doing so, the first image controller converts the high resolution image data to the general resolution image data and forwards the general resolution image data to the second image controller which outputs the general resolution image data to the display part 103. The second image controller outputs the general image data provided from the first image controller to the display part 103 by applying the aforementioned algorithms and simultaneously buffers the general image data to the memory part 105. Next, when the video shooting of the high resolution ends, the first image controller and the second image controller can compress and encode the high resolution image data and the general image data temporarily stored, generate them as files, and store the files the memory part 105.

The HD video file and the general video file generated at the same time as the HD video file are output through the display part 103 as follows. If the display part 103 can process the HD video data, the first image controller decodes the HD video file to the HD video data and then outputs the HD video data directly to the display part 103. Yet, in this exemplary embodiment, the display part 103 processes the general resolution image data processable by the second image controller. Accordingly, when the HD video file is output to the display part 103, the second image controller outputs the corresponding general video file generated at the same time as the HD video file, to the display part 103. In more detail, to output the HD video file to the display part 103, the first image controller does not need to decode to the HD video data, to convert to the general resolution image data processable by the second image controller, and to provide the general resolution image data to the second image controller.

Namely, as generating the HD video file of the high resolution, the image controller 101 can selectively generate the VGA general video (or sub-video) of the general resolution at the same time and store the VGA general video to the memory part 104. The sub-video can be generated to meet conditions such as preset time and resolution. In this exemplary embodiment, the image controller 101 can selectively use the HD video file and the sub-video file in the image related operation executed at the terminal, such as preview and transfer.

For instance, the sub-video file can be used in the preview in lieu of the corresponding HD video file. That is, in the preview operation to acquire contents of several HD video files of the subject, the image controller 101 can control to decode the corresponding sub-video file and to display the decoded sub-video file in the display part 103. Since the sub-video file has the smaller capacity and size than the HD video, it can allow the fast access and execution. The HD video file can be previewed by encoding and decoding back to the smaller size, but which requires a considerable time. Herein, it is assumed that the display part 103 of the portable terminal is suited to process the video data of the general resolution.

Alternatively, the sub-video file can be used for the transfer to other terminals in lieu of the corresponding HD video file. To transfer the video file of the corresponding object to the other terminal by wire or by wireless, the sub-video file of the corresponding HD video file can be transferred. Since the sub-video file has the smaller capacity than the corresponding HD video file, it is advantageous to transfer the sub-video file. In addition, when the other terminal to receive the video file does not support the HD video file, the sub-video file can address the compatibility problem.

When the portable terminal is connected with an external device supporting the HD video, such as TV, the image controller 101 accesses the corresponding HD video file.

Figure 2:
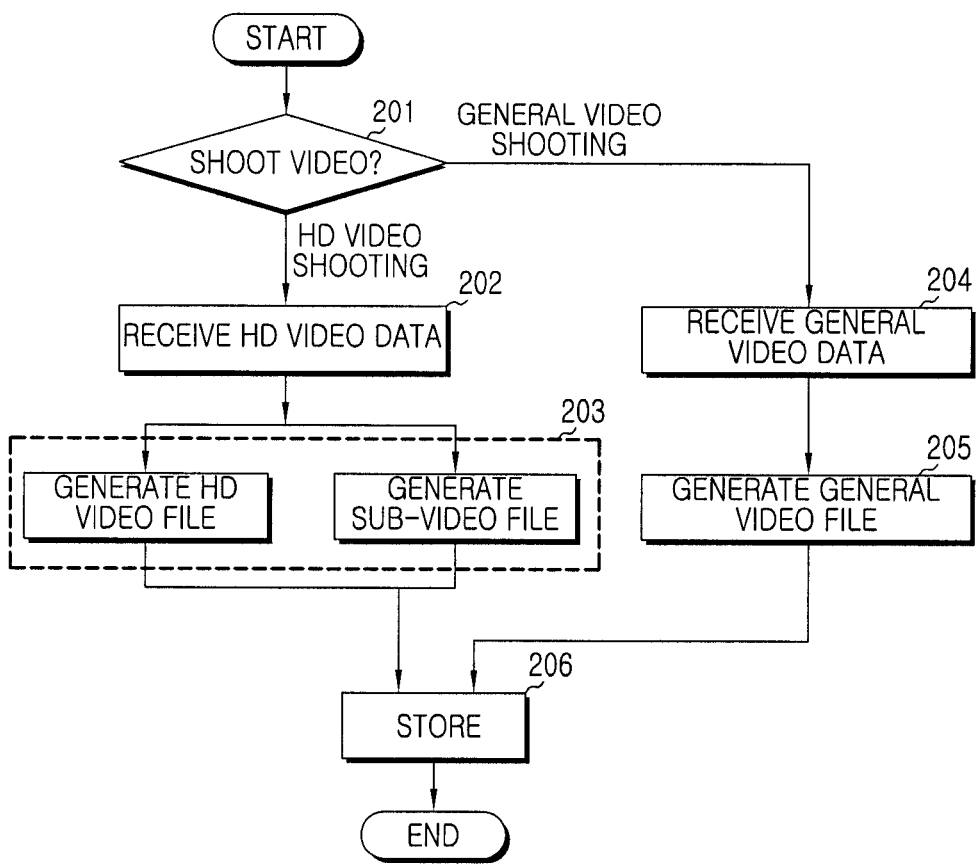
FIG. 2 is a flowchart of a video capturing method according to an exemplary embodiment of the present invention.

FIG. 2 is a flowchart of a video capturing method according to an exemplary embodiment of the present invention.

Referring now to FIG. 2, when detecting the request of the general video shooting in step 201, the image controller 101 receives the general video data of the corresponding object from the camera part 102 in step 204. After generating the general video data fed from the camera part 102 as the video file of the general resolution having the preset resolution and frame size in step 205, the image controller 101 stores the generated video file to the memory part 105 in step 206.

When detecting the request of the HD video shooting in step 201, the image controller 101 receives the HD video data of the corresponding object from the camera part 102 in step 202. In step 203, the image controller 101 generates the HD video file and the sub-video file having the lower resolution and the smaller frame size than the HD video file from the HD video data fed from the camera part 102 at the same time. In step 206, the image controller 101 stores the HD video file and the sub-video file simultaneously generated to the memory part 105.

As stated above, in the image related operation such as preview of the HD video file and transfer to other terminal, the image controller 101 allows the fast access using the corresponding sub-video file generated at the same as the HD video file, which is not shown.

As set forth above, by distinguishing and using the high definition video and the general definition video made from the corresponding object at the same time, in the corresponding operation such as preview, transfer to other terminal, and connection to high definition player, the management efficiency of the terminal and the user's satisfaction can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image processing apparatus comprising:
   a camera part for imaging an object and outputting image data;
   a display part for receiving an image signal corresponding to the image data of the camera part and displaying a corresponding image; and
   an image controller for outputting an image signal processed from the image data output from the camera part, to the display part, generating and storing a corresponding image file,
   while generating the first image file, the image controller generates and stores the second image file of a lower resolution than the first image file and outputs display of the second image file to provide a lower resolution preview of the first image file while generating the first image file.

2. The image processing apparatus of claim 1, wherein the image controller comprises a first image controller and a second image controller for respective conversion of image data at different resolutions are activated.

3. The image processing apparatus of claim 1, wherein the image controller comprises:
   a first image controller for converting image data of a first resolution provided from the camera part to a corresponding image signal, outputting the image signal to the display part, generating and storing the first image file from the image data of the first resolution; and
   a second image controller for converting the image data of the second resolution output from the camera part to a corresponding image signal, outputting the corresponding image signal to the display part, and generating the second image file from the image data of the second resolution.

4. The image processing apparatus of claim 3, wherein the first image controller and the second image controller are activated.

5. The image processing apparatus of claim 1, wherein the image controller uses the second image file to transfer image data to other terminal.

6. The image processing apparatus of claim 1, wherein, when the image processing apparatus is connected to an external device supporting play of the first image file, the image controller accesses the first image file.

7. The image processing apparatus of claim 1, wherein the first image file is a High Definition (HD) image file.

8. An image processing method of an image processing apparatus which comprises a camera part for imaging an object and outputting image data, a display part for receiving an image signal corresponding to the image data of the camera part and displaying a corresponding image, and an image controller for outputting the image signal to the display part by processing the image data output from the camera part, generating and storing a corresponding image file, the method comprising:
   while generating the first image file, the image controller generates and stores the second image file of a lower resolution than the first image file and outputs display of the second image file to provide a lower resolution preview of the first image file.

9. The image processing method of claim 8, wherein the controlling to selectively access the first image file and the second image file in the image related operation comprises:
   when transferring an image file of a corresponding object to another terminal, transferring the second image file in lieu of the first image file.

10. The image processing method of claim 8, wherein the controlling to selectively access the first image file and the second image file in the image related operation comprises:
    when the image processing apparatus is connected to an external device supporting play of the first image file, accessing the first image file.

11. The image processing method of claim 8, wherein the first image file is a High Definition (HD) image file.

12. The image processing apparatus of claim 1, wherein the image controller comprises a first imaging module and a second imaging module, the first imaging module generates and stores the first image file based on the image data output from the camera part, the second imaging module generate and stores the second image file based on at least one of image data output from the camera part and the first image file.

13. The image processing method of claim 8, wherein the image controller comprises a first imaging module and a second imaging module, the first imaging module generates and stores the first image file based on the image data output from the camera part, the second imaging module generate and stores the second image file based on at least one of image data output from the camera part and the first image file.

* * * * *

UNITED STATES PATENT AND TRADEMARK OFFICE
CERTIFICATE OF CORRECTION

PATENT NO.        : 8,860,844 B2                                          Page 1 of 1
APPLICATION NO.   : 12/724514
DATED             : October 14, 2014
INVENTOR(S)       : Dong-Young Choi et al.

It is certified that error appears in the above-identified patent and that said Letters Patent is hereby corrected as shown below:

IN THE CLAIMS:

Column 7, Claim 1, Line 53 should read as follows:
--...generating a first image...--

Column 7, Claim 1, Line 54 should read as follows:
--...stores a second image...--

Column 7, Claim 1, Line 57 should read as follows:
--...the first image file...--

Column 8, Claim 8, Line 31 should read as follows:
--...generating a first image...--

Column 8, Claim 8, Line 32 should read as follows:
--...stores a second image...--

Signed and Sealed this
Third Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,860,844 B2 | Page 1 of 1 |
| APPLICATION NO. | : 12/724514 | |
| DATED | : October 14, 2014 | |
| INVENTOR(S) | : Dong-Young Choi et al. | |

It is certified that error appears in the above-identified patent and that said Letters Patent is hereby corrected as shown below:

On the Title Page, Item 54 and In the Specification, Column 1, Lines 1-3, should read as follows:
--...APPARATUS AND METHOD FOR IMAGE PROCESSING THAT GENERATES HIGH DEFINITION AND GENERAL DEFINITION VIDEO AT THE SAME TIME...--

Signed and Sealed this
Second Day of June, 2015

Michelle K. Lee
*Director of the United States Patent and Trademark Office*